United States Patent [19]
Inaba

[11] Patent Number: 5,447,828
[45] Date of Patent: Sep. 5, 1995

[54] PHOTOGRAPHIC FILM

[76] Inventor: Minoru Inaba, No. 1116, Oaza Samukawa, Oyama-shi, Tochigi-ken, Japan

[21] Appl. No.: 275,996

[22] Filed: Jul. 15, 1994

[30] Foreign Application Priority Data

May 23, 1994 [JP] Japan ................................ 6-108803

[51] Int. Cl.$^6$ ...................... G03C 11/14; G03B 21/64
[52] U.S. Cl. .................................. 430/496; 430/495; 430/501; 352/241; 40/159.2
[58] Field of Search ................... 430/495, 496, 501; 352/241; 40/159.2

[56] References Cited

U.S. PATENT DOCUMENTS

| | | | |
|---|---|---|---|
| 2,527,765 | 10/1950 | Roehrl | 40/159.2 |
| 4,295,713 | 10/1981 | Edwards | 352/241 |
| 5,338,650 | 8/1994 | Iwagaki | 430/496 |

FOREIGN PATENT DOCUMENTS

| | | | |
|---|---|---|---|
| 423398 | 4/1911 | France | 352/241 |
| 1134573 | 4/1957 | France | 352/241 |

Primary Examiner—Charles L. Bowers, Jr.
Assistant Examiner—Mark F. Huff
Attorney, Agent, or Firm—Fattibene and Fattibene; Paul A. Fattibene; Arthur T. Fattibene

[57] ABSTRACT

In cutting a film into individual screens and in fitting the screens onto the slide mounts, the positions for cutting the film are correctly set so that the film can be cut easily and quickly. For this purpose, holes are perforated in an opposing manner in both side portions of the film in a direction in which it is fed. The film is loaded into the camera, and a line L connecting the centers of the holes is brought into agreement with the center line of a gap portion between the screens. The film is divided into individual screens when it is cut using a pair of scissors along the lines L that connect the holes of the film. The ends of the holes in the direction of feed are semicircularly formed. Therefore, if the film divided into individual screens is brought into engagement with the positioning pins of the slide mount, semicircular portions of the holes and the positioning pins are fitted to each other, and the film is correctly fitted onto the slide mount.

1 Claim, 6 Drawing Sheets

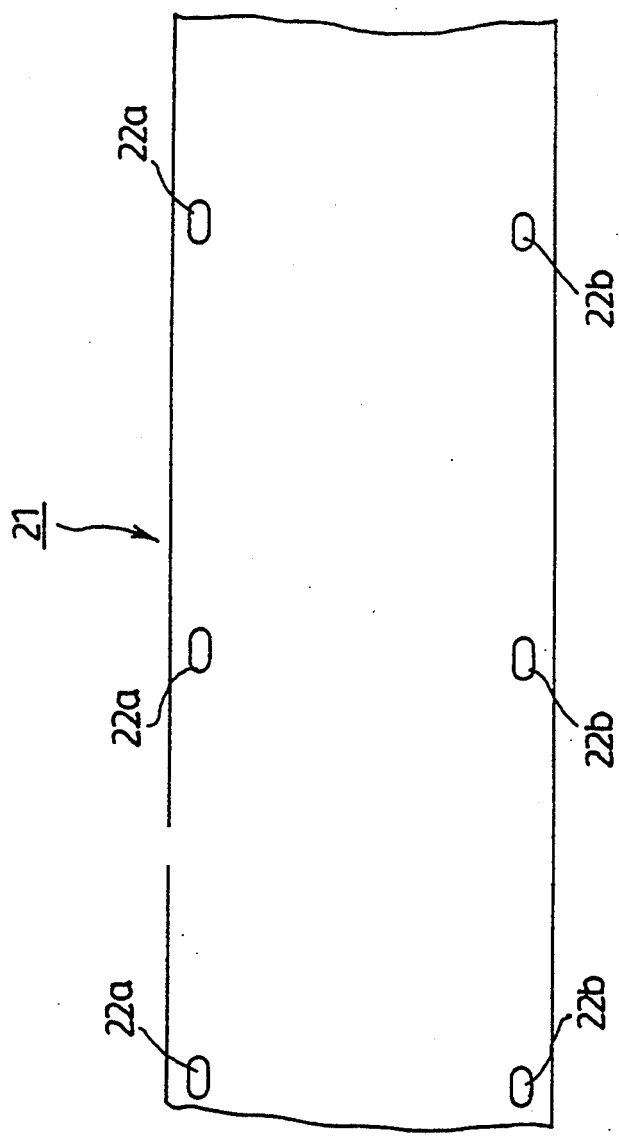

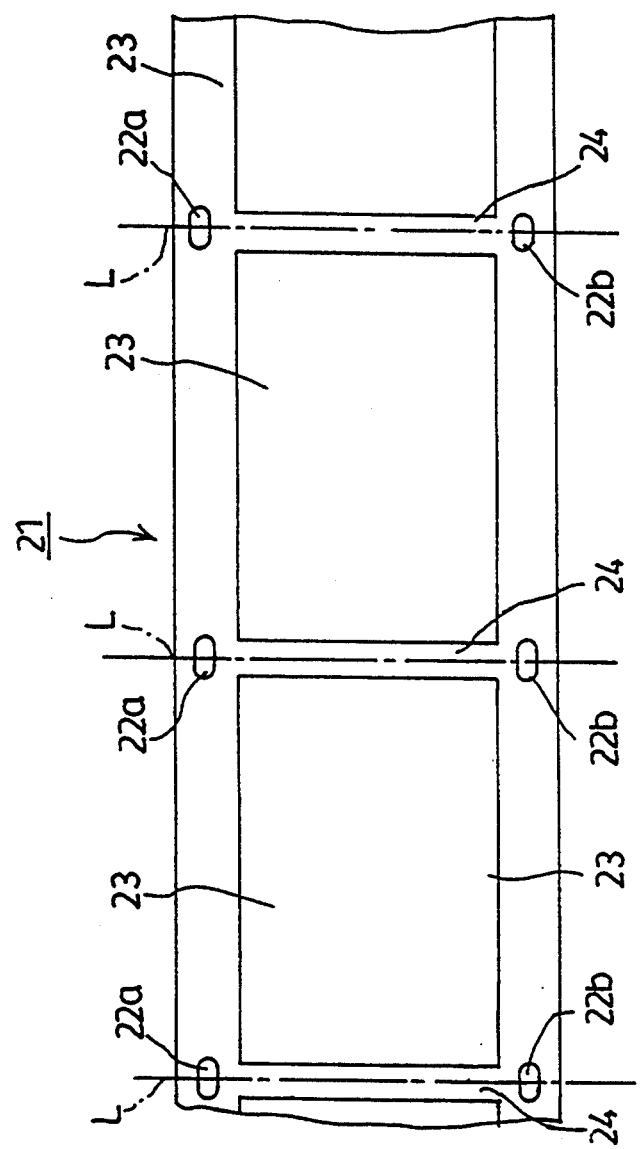

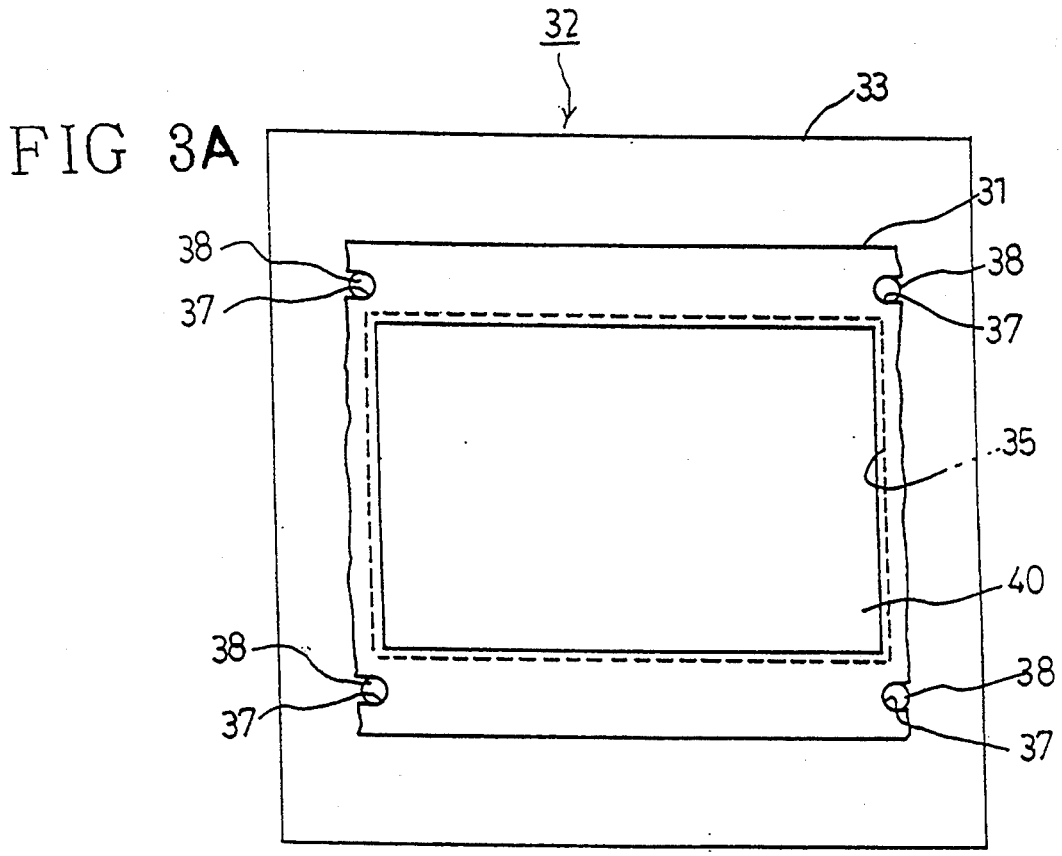
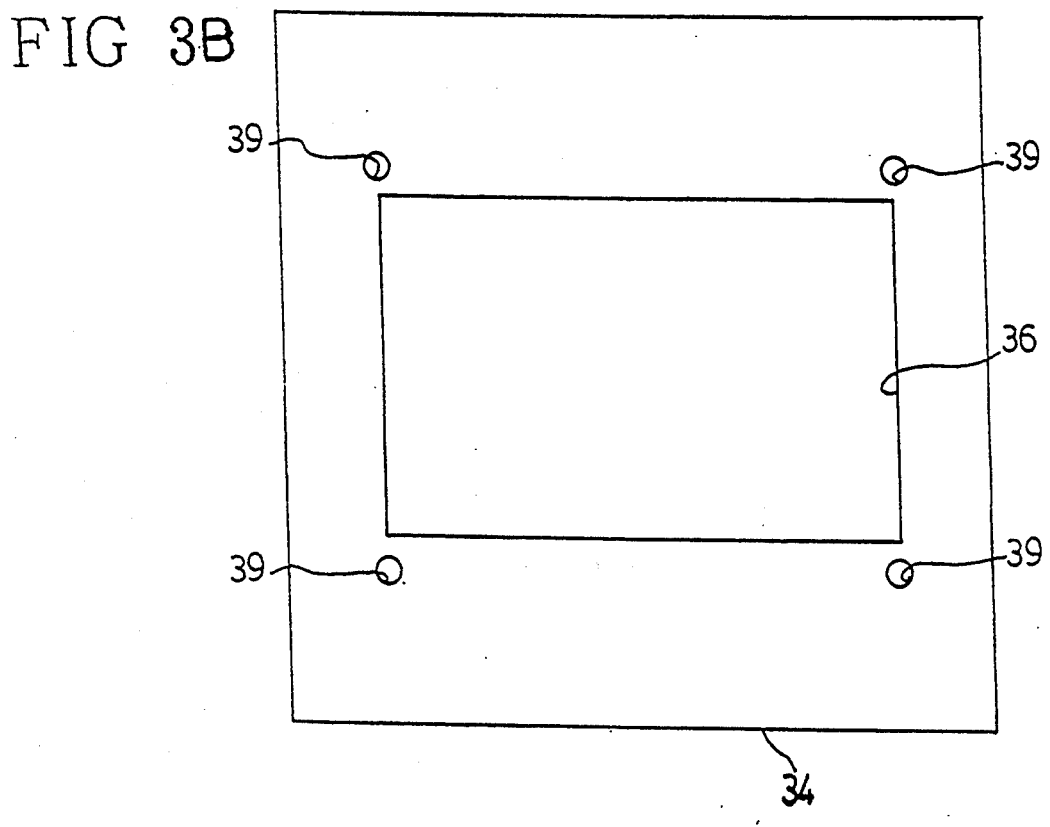

PHOTOGRAPHIC FILM

BACKGROUND OF THE INVENTION

The present invention relates to a photographic film and, particularly, to a photographic film that can be easily cut into individual screens.

DESCRIPTION OF THE PRIOR ART

Photographic films of a variety of kinds of shapes have hitherto been developed. In recent years, a perforated film having a width of 35 mm has been used most extensively.

FIG. 4 illustrates a conventional film 1 having a width of 35 mm which is obtained by developing a positive film for slide. The film 1 has a width of 35 mm and has holes 2 perforated in an opposing manner along both side portions thereof in the direction in which it is fed. The holes 2 have nearly a rectangular shape and the long sides of the holes 2 are oriented in the direction of width of the film 1. On the film 1 are photographed screen portions 3 and gap portions 4 are provided among the screen portions 3. To divide the film into individual screens, therefore, the gap portions 4 are cut along the centers thereof using a pair of scissors; i.e., a film 5 of one screen is formed as shown in FIG. 5.

FIG. 6 illustrates a state where the film 5 is fitted onto a slide mount 6 which is constituted by a mount 7 and a cover 8 that are made of, for example, a plastic material. The mount 7 is provided with a film-placing portion 9 which has a size nearly equal to the size of a screen and forms a step with respect to the surface of the mount 7. A window 10 is opened at the central portion of the film-placing portion 9. Furthermore, recessed portions 11 are formed in the periphery of the film-placing portion 9, and the outer peripheries of the recessed portions 11 are formed in a protruding manner. A window 12 is formed in the cover 8, and protruded portions 13 are provided on the periphery of the window 12. By fitting the protruded portions 13 into the recessed portions 11 of the mount 7, the mount 7 and the cover 8 are firmly fitted together; i.e., the window 12 and the window 12 are superposed one upon the other to form the slide mount 6.

The film 5 that is cut into a unit of screen is placed on the film-placing portion 9 and, then, the mount 7 and the cover 8 are fitted together so that the film 5 is fitted onto the slide mount 6.

In the conventional film, holes are formed in an opposing manner in both side portions of the film in a direction in which it is fed. The holes are perforated in a number of, for example, eight for one screen in both side portions thereof maintaining an equal distance. When a picture is taken by using the above film as a positive film for slide, portions near the gaps of the film may often be developed into a dark color depending upon the subject that is photographed. When the film is to be cut into individual screens, therefore, it becomes very difficult to confirm by naked eyes the gap portions among the screens, often causing the film to be cut at incorrect positions. Moreover, even when the holes on both sides of the film are so set as to be located at the gap portions in taking a photograph on the film, the distance among the holes are so narrow that a neighboring pair of opposing holes may be erroneously regarded to be the aimed pair of opposing holes resulting in an incorrect cutting of the film.

To fit the film onto the slide mount, furthermore, the film is placed on the film-placing portion formed in the mount of the slide mount. The width of the film-placing portion is set to be in agreement with a specified value of the film, e.g., 35 mm and is, hence, correctly placed in position. On the other hand, the film is cut by hand in the lengthwise direction thereof which makes it difficult to cut the film into a predetermined size. Therefore, the film-placing portion has a size in the lengthwise direction thereof which is larger than the size of one screen. Accordingly, the film that is inserted in the slide mount has a margin in the feeding lengthwise direction and may undergo a deviation in position.

Therefore, there arouse technical problems in regard to cutting the film into individual screens at correct positions and in regard to correctly fitting the film that is cut into a screen onto the slide mount. The object of the present invention is to solve these problems.

SUMMARY OF THE INVENTION

The present invention was proposed in order to achieve the above object, and provides a photographic film in which holes are perforated in both side portions of the film in a direction in which it is fed, the holes being opposed to each other at gap portions among the photographed screens, as well as a photographic film in which the holes that are perforated therein have nearly an elliptic shape, the long sides thereof being oriented in the direction in which said film is fed.

According to the invention, holes are perforated in an opposing manner in both side portions of the film in a direction in which it is fed, and the pair of holes are arranged over the distance of gap portion between the photographed screens of the film. Therefore, if the picture is so taken that the pair of holes come into agreement with the center of the gap portion between the screens, then, the film can be divided into individual screens by cutting the film along a line that connects the centers of the pair of holes.

According to the invention, the holes formed in both side portions of the film are elongated in a direction in which the film is fed so as to serve as a distinct target for cutting the film into the screens. The ends of the holes in the lengthwise direction are semicircularly formed contributing to increasing the ranges that come into contact with the positioning pins of the slide mount.

BRIEF DESCRIPTION OF THE DRAWINGS

FIG. 1 is a plan view of a film which illustrates an embodiment of the present invention;

FIG. 2 is a plan view thereof illustrating the state in which the photographed film is developed;

FIG. 3A is a plan view illustrating the state in which the film cut into a screen is placed on a slide mount;

FIG. 3B is a plan view illustrating the state in which the film cut into a screen is placed in a slide mount with the cover closed;

DETAILED DESCRIPTION OF PREFERRED EMBODIMENTS

Figure 4:
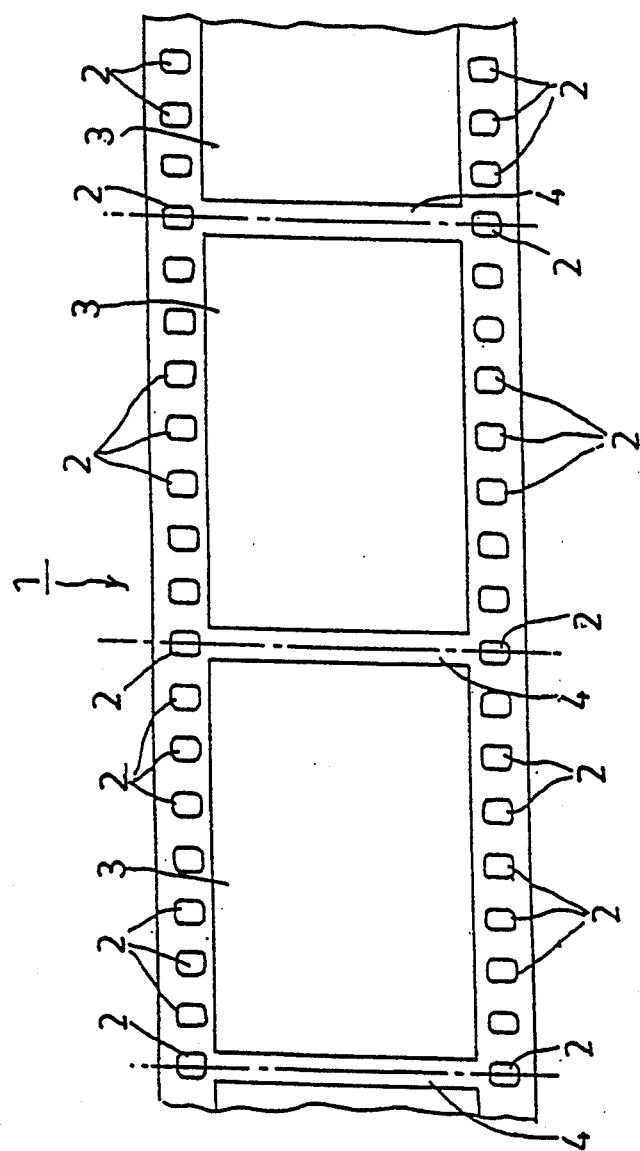
FIG. 4 is a plan view of a film according to a prior art.
Figure 5:
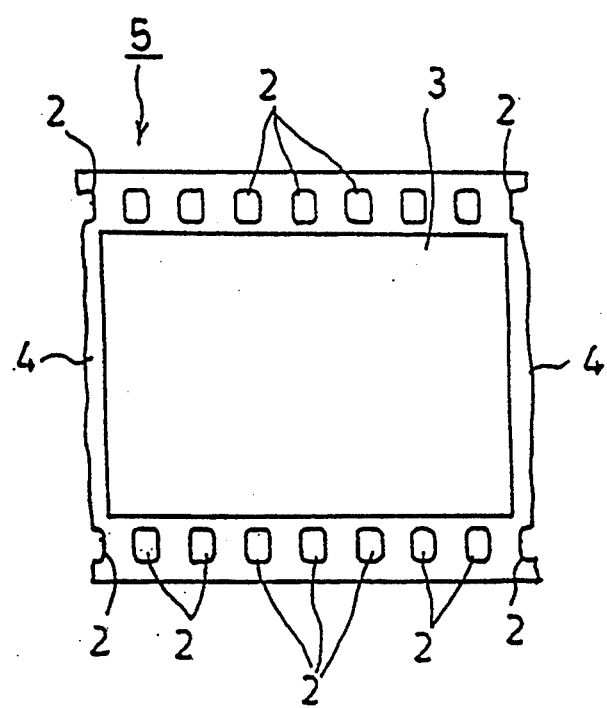
FIG. 5 is a plan view showing the shape of the film cut into a screen according to the prior art.
Figure 6:
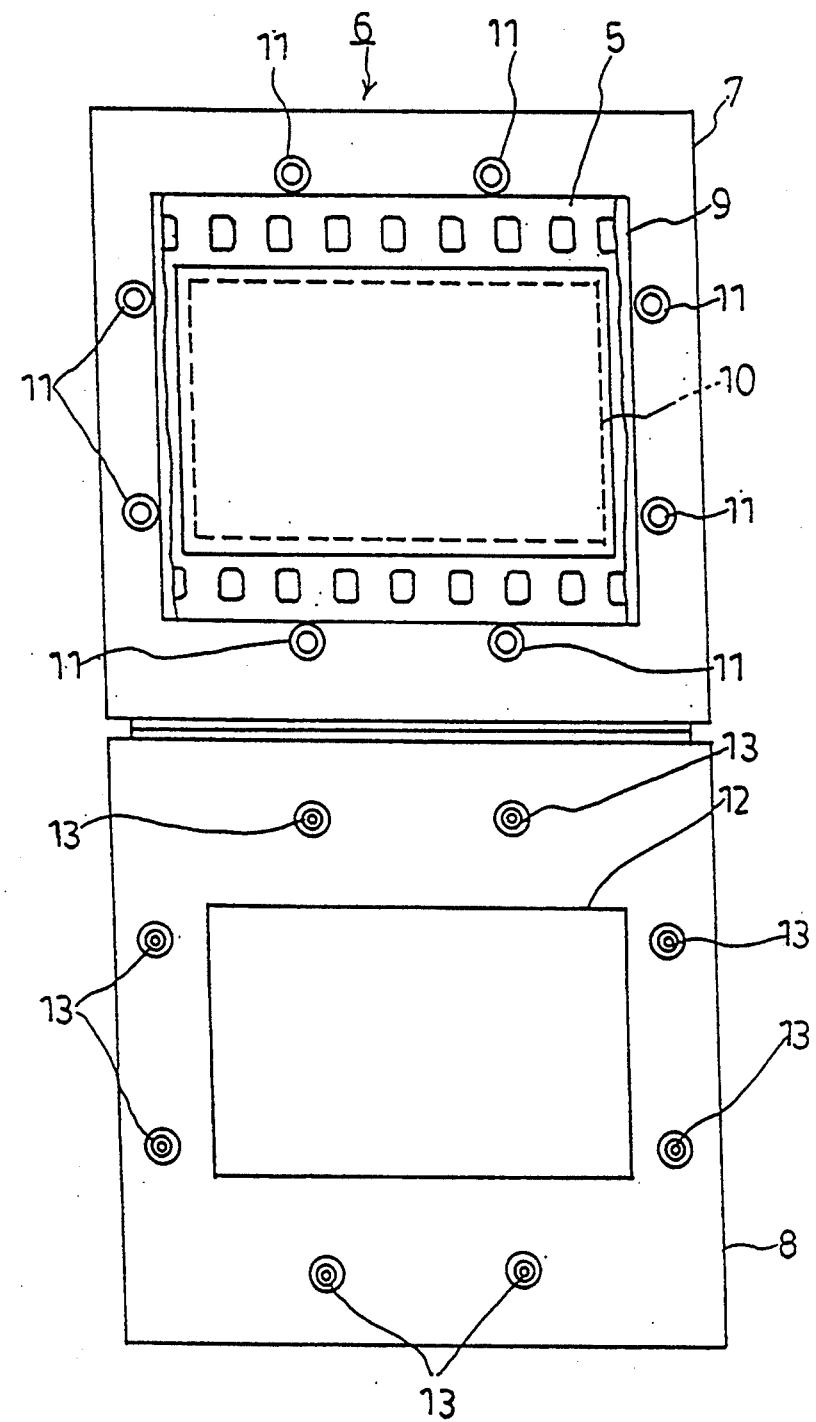
FIG. 6 is a plan view illustrating the state in which the film is placed on a slide mount according to the prior art.

An embodiment of the present invention will now be described in detail with reference to FIGS. 1 to 3. FIG. 1 illustrates a photographic film 21 having holes 22a and 22b that are perforated in an opposing manner in both side portions of the film 21 in a direction in which it is fed. The holes 22a and 22b have an elliptic shape and a width that is equal to the diameter of positioning pins that will be described later. FIG. 2 illustrates a state in which are developed photographs taken on the film 21 which is a positive film for slide by using a camera. Here, the camera in which the film 21 is loaded to take pictures is equipped with a mechanism that brings the lines L connecting the centers of the holes 22a and 22b formed in an opposing manner in the film 21 into agreement with the center lines of the gap portions 24 provided among the screen portions 23.

If the film 21 is cut by using a pair of scissors along the lines L connecting the opposing holes 22a, 22b, then, the screen portions 23 of the film 21 are cut along the center of the gap portions 24 at both ends of each of the screen portions 23. Thus, the film is divided into individual screens.

FIGS. 3A and 3B illustrate the state in which a film 31 divided into the screens is fitted onto a slide mount 32. The slide mount 32 is constituted by a mount 33 and a cover 34 in which are perforated windows 35 and 36, respectively. As shown in FIG. 3A, pole-like positioning pins 38 are studded at positions corresponding to holes 37 on both sides of the film 31 at four corners of the window 35 of the mount 33.

As shown in FIG. 3B, furthermore, positioning holes 39 are formed in the cover 34 at positions where the positioning pins 38 come into engagement. To place the film 31 on the slide mount 32, the holes 37 of the film 31 are brought into engagement with the positioning pins 38 of the mount 33, so that the semicircular portions of the holes 37 and the side portions of the positioning pins 38 are fitted to each other. Then, the cover 34 is placed on the mount 33, and the positioning pins 38 and the positioning holes 39 are engaged with each other, so that the film 31 is correctly fitted onto the slide mount 32. The screen portion 40 of the film 31 is disposed on the inside of the windows 35 and 36 of the slide mount 32 and is not hindered by the windows 35 and 36.

Though the holes 22a, 22b and 37 formed in the films 21 and 31 were of an elliptic shape in this embodiment, the same effects can be exhibited even when the holes 22a, 22b and 37 have a rhombic shape or an oval shape provided both ends of these holes in the feeding direction have a nearly semicircular shape.

The present invention can be modified in a variety of other ways without departing from the spirit and scope of the invention, and it should be noted that the present invention encompasses even those modified embodiments as a matter of course.

According to the invention as described in detail in the foregoing embodiment, holes are perforated in an opposing manner in the gap portions that are provided among the screens in both side portions of the film in a direction in which it is fed. Therefore, cutting positions among the screens can be correctly set along the lines that connect the centers of the holes. Thus, the film can be cut easily and quickly into the individual screens.

According to the invention in which the ends of the holes formed in both side portions of the film have a semicircular shape in the feeding direction, the pole-like positioning pins of the slide mount come into engagement in an inscribing manner with the holes of the film when the film that is divided into the screens is fitted into the slide mount. Therefore, the contacting point between the hole and the positioning pin is expanded as much a possible, enabling the film to be fitted onto the slide mount or the like firmly and correctly.

Moreover, since the holes of the film have a rectangular shape in the direction of width of the film, it is allowed to expand the picture-taking area of the film and the film can be efficiently utilized. When the size of the photographic screen is maintained to be the same as that of the prior art, furthermore, the width of the film can be shortened, exhibiting various effects such as enabling the outer size of the film to be decreased.

I claim:
1. A photographic film comprising:
   a plurality of screen portions extending longitudinally along the photographic film;
   a plurality of gap portions formed between each of said plurality of screen portions, said plurality of gap portions each having a longitudinal axis laterally extending across the photographic film; and
   the photographic film having opposing longitudinal side portions, the opposing longitudinal side portions having a plurality of elliptical holes formed therein, the plurality of elliptical holes each having a longitudinal axis, the longitudinal axis of each one of the plurality of elliptical holes intersecting and being substantially perpendicular to the longitudinal axis of a respective one of said plurality of gap portions, such that the plurality of elliptical holes are elongated in a direction in which the photographic film is fed, and positioned only over said plurality of gap portions,
   whereby laterally opposing pairs of the plurality of elliptical holes serve as a distinct target for cutting the film into individual screen portions.

* * * * *